United States Patent
Leslie et al.

(10) Patent No.: US 12,531,203 B2
(45) Date of Patent: Jan. 20, 2026

(54) TECHNIQUES FOR IMAGING LOW DUTY CYCLE SIGNALS USING A SCANNING ELECTRON MICROSCOPE

(71) Applicant: c/o FEI Company, Hillsboro, OR (US)

(72) Inventors: Neel Leslie, San Jose, CA (US); James Vickers, San Jose, CA (US)

(73) Assignee: FEI Company, Hillsboro, OR (US)

( * ) Notice: Subject to any disclaimer, the term of this patent is extended or adjusted under 35 U.S.C. 154(b) by 336 days.

(21) Appl. No.: 18/456,246

(22) Filed: Aug. 25, 2023

(65) Prior Publication Data

US 2025/0069845 A1     Feb. 27, 2025

(51) Int. Cl.
| | |
|---|---|
| *H01J 37/244* | (2006.01) |
| *H01J 37/04* | (2006.01) |
| *H01J 37/22* | (2006.01) |
| *H01J 37/26* | (2006.01) |
| *H01J 37/28* | (2006.01) |

(52) U.S. Cl.
CPC .......... *H01J 37/244* (2013.01); *H01J 37/045* (2013.01); *H01J 37/222* (2013.01); *H01J 37/265* (2013.01);
(Continued)

(58) Field of Classification Search
CPC .. H01J 37/00; H01J 37/02; H01J 37/26; H01J 37/28; H01J 37/265; H01J 37/244;
(Continued)

(56) References Cited

U.S. PATENT DOCUMENTS

| | | | | |
|---|---|---|---|---|
| 7,848,562 | B1 * | 12/2010 | Jacobson | ................ G06T 7/001 |
| | | | | 382/145 |
| 2001/0019275 | A1 * | 9/2001 | Pace | ................... G01R 31/2893 |
| | | | | 324/750.23 |

(Continued)

FOREIGN PATENT DOCUMENTS

| | | |
|---|---|---|
| KR | 20140101337 A | 8/2014 |
| WO | 2019066802 A1 | 4/2019 |

OTHER PUBLICATIONS

Leslie et al. "2GHz Contactless Electron Beam Probing" ISTFA 2022: Conference Proceedings from the 48th International Symposium for Testing and Failure Analysis, Pasadena Convention, Oct. 30-Nov. 3, 2022, Pasadena, California.

(Continued)

*Primary Examiner* — Jason L McCormack
(74) *Attorney, Agent, or Firm* — Leron Vandsburger

(57) ABSTRACT

Systems, components, methods, and algorithms for generating difference data are described. A computer-implemented method includes directing a first pulse of charged particles toward a sample. The method can include generating first detector data based at least in part on interactions between the charged particles of the first pulse and the sample. The method can include directing a second pulse of charged particles toward the sample. The method can include generating second detector data based at least in part on interactions between the charged particles of the second pulse and the sample. The method can also include generating difference data using the first detector data and the second detector data, wherein the difference data describe a change between an "on" state of the sample and an "off" state of the sample.

20 Claims, 5 Drawing Sheets

(52) U.S. Cl.
CPC ....... *H01J 37/28* (2013.01); *H01J 2237/2448* (2013.01)

(58) Field of Classification Search
CPC .................. H01J 37/222; H01J 37/045; H01J 2237/2448; G01R 31/307; G01R 31/287; G01R 31/2851; G01R 29/26; G01R 29/04; G01R 29/02; G01R 23/12; G01R 19/0053; G01N 23/2251; G01N 23/22; G01N 23/04; G01N 23/00
USPC ................................ 250/306, 307, 311, 397
See application file for complete search history.

(56) References Cited

U.S. PATENT DOCUMENTS

| | | |
|---|---|---|
| 2013/0186767 A1 | 7/2013 | Castro et al. |
| 2014/0149811 A1 | 5/2014 | Ross et al. |
| 2014/0331098 A1 | 11/2014 | Martin et al. |
| 2015/0377958 A1* | 12/2015 | Ukraintsev ............ G01Q 30/02 324/750.18 |
| 2016/0370425 A1 | 12/2016 | Stallcup et al. |
| 2023/0305057 A1 | 9/2023 | Tong et al. |
| 2023/0317408 A1 | 10/2023 | Tong et al. |

OTHER PUBLICATIONS

Vallet et al. "Electrical testing for failure analysis: E-beam Testing" Microelectronic Engineering, 1999 vol. 29, pp. 157-167.

Lai et al. "Nanoprobing Applications with Capacitance-Voltage (C-V) and Pulsed Current-Voltage (PI-V) Measurements for Device Failure Analysis," ISTFA 2015: Conference Proceedings from the 41st International Symposium for Testing and Failure Analysis, Nov. 1-5, 2015, Portland, Oregon.

* cited by examiner

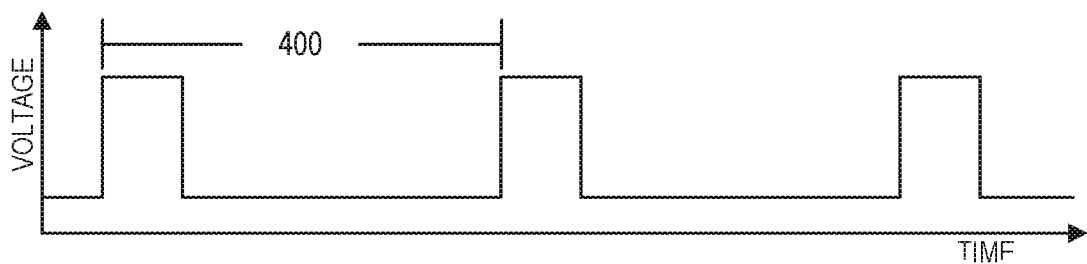
FIG. 4A
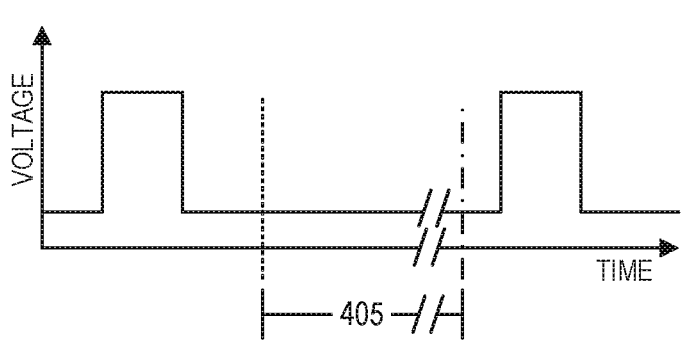 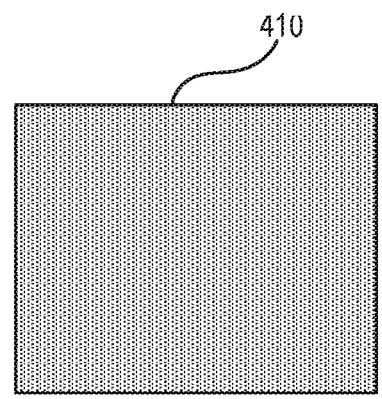
FIG. 4B  FIG. 4C
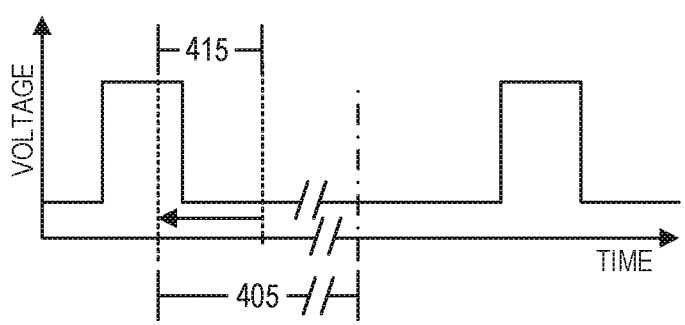 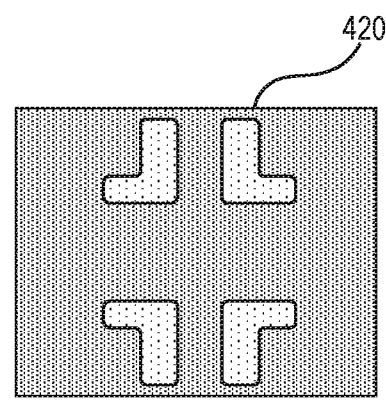
FIG. 4D  FIG. 4E
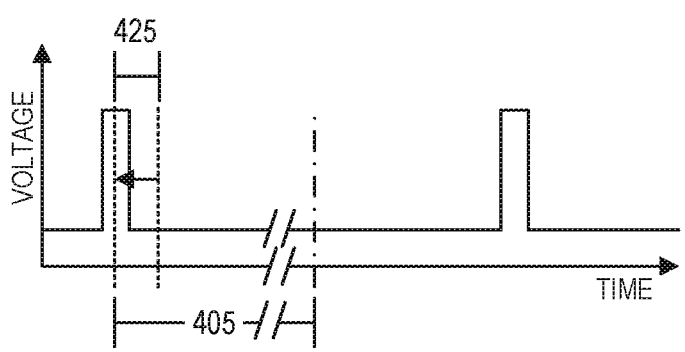 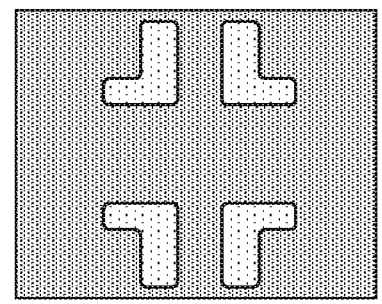
FIG. 4F  FIG. 4G

TECHNIQUES FOR IMAGING LOW DUTY CYCLE SIGNALS USING A SCANNING ELECTRON MICROSCOPE

TECHNICAL FIELD

Embodiments of the present disclosure are directed to electronic testing systems, as well as algorithms and methods for their operation. In particular, some embodiments are directed toward techniques for integrated circuit testing.

BACKGROUND

Integrated circuit (IC) testing involves measurement of individual transistors or groups of transistors of a semiconductor wafer or wafer section (e.g., a diced wafer), termed a "device under test" or DUT. A typical IC testing regime includes applying a periodic signal to a circuit over multiple operating conditions at which the circuit has been designed to operate, and to determine at what point the circuit fails to operate to specifications. As an IC approaches failure, the duty cycle tends to deviate from a nominal 50% duty cycle, corresponding to a signal that is "on" for equal time as it is "off." Such deviation from the nominal 50% duty cycle implicates a decrease in the average power supplied to the circuit under observation, and a measure of the duty cycle can be used to better understand IC device performance under test, especially as the IC device begins to fail.

Typical approaches to measuring electrical activity on a DUT include directing a beam of charged particles at the DUT, measuring signal intensity as a function of time a multiple points across a waveform of a test pattern, reconstructing the waveform, and using frequency domain information to detect DUT activity at a given clock frequency. Unfortunately, signal-to-noise performance decreases as the duty cycle deviates from a 50% value. Such performance loss is attributable at least in part to the sampling mechanism of pulsed electron imaging that more heavily weights whichever of the states corresponds to the larger proportion of the waveform, especially where the test waveform is a square-wave signal. There is a need, therefore, for electron imaging techniques that improve signal-to-noise as duty cycle trends to 0% or 100% during an IC test.

BRIEF SUMMARY

Systems, components, methods, and algorithms for generating difference data are described. In a first aspect, a computer-implemented method includes directing a first pulse of charged particles toward a sample. The method can include generating first detector data based at least in part on interactions between the charged particles of the first pulse and the sample. The method can include directing a second pulse of charged particles toward the sample. The method can include generating second detector data based at least in part on interactions between the charged particles of the second pulse and the sample. The method can also include generating difference data using the first detector data and the second detector data, wherein the difference data describe a change between an "on" state of the sample and an "off" state of the sample.

In some embodiments, the first pulse and the second pulse are separated in time by a value of about A*P. A can be a half-integer. The value "P" can be a period of a periodic electrical signal applied to the sample, measured in units of time. The value of A can be greater than or about equal to the smallest half-integer for which A*P is longer than a temporal resolution of a system generating the first detector data and the second detector data.

In some embodiments, the method further includes generating a beam of charged particles using charged particle source, operating a beam blanker using a periodic pulse signal to pulse the beam of charged particles, the pulse signal having a frequency, "f," and a phase, "φ," and modifying the phase of a pulse signal to align an "on" value of the pulse signal in time with an "on" value of an electrical signal applied to the sample. Modifying the phase of the pulse signal can include incrementing the phase of the pulse signal by a differential "Δφ" over a set of phase values, generating a set of detector data comprising respective "on" data and respective "off" data for at least a subset of the phase values, generating a set of difference data using the set of detector data, and determining a phase offset using the set of difference data. The phase offset can correspond to a discontinuity in an average value of the set of difference data.

In some embodiments, the first pulse of charged particles and the second pulse of charged particles can be generated using a scanning electron microscope in imaging mode. The difference data can include a difference image of a surface of the sample. The first pulse of charged particles and the second pulse of charged particles can be generated using a scanning electron microscope in spot mode. The difference data can include a difference signal of amplitude against time.

In some embodiments, the first detector data correspond to the "on" state of the sample. The second detector data can correspond to the "off" state of the sample. Generating the difference data can include generating a first set of detector data for the "on" state of the sample, including the first detector data, generating a second set of detector data for the "off" state of the sample, including the second detector data, and defining the difference data as a difference of the first set of detector data and the second set of detector data.

In some embodiments, the sample includes an integrated circuit. The charged particles can be directed at a region of the integrated circuit including a conductive feature.

In some embodiments, the difference data can include a secondary electron image.

In a second aspect, a system includes a charged particle source. The charged particle source can be configured to generate pulses of charged particles. The system can include control circuitry, operably coupled with the charged particle source. The system can also include one or more non-transitory machine-readable storage media, operably coupled with the control circuitry and storing instructions that, when executed, cause the system to perform operations of the preceding aspects.

The terms and expressions which have been employed are used as terms of description and not of limitation, and there is no intention in the use of such terms and expressions of excluding any equivalents of the features shown and described or portions thereof, but it is recognized that various modifications are possible within the scope of the claimed subject matter. Thus, it should be understood that although the present claimed subject matter has been specifically disclosed by embodiments and optional features, modification and variation of the concepts herein disclosed can be resorted to by those skilled in the art, and that such modifications and variations are considered to be within the scope of this disclosure as defined by the appended claims.

BRIEF DESCRIPTION OF THE SEVERAL VIEWS OF THE DRAWINGS

The foregoing aspects and many of the attendant advantages of the present disclosure will become more readily appreciated as the same become better understood by reference to the following detailed description, when taken in conjunction with the accompanying drawings.

FIGS. 4A-4G are schematic diagrams illustrating example integrated circuit testing data, including voltage data and difference images, in accordance with some embodiments of the present disclosure.

Figure 1:
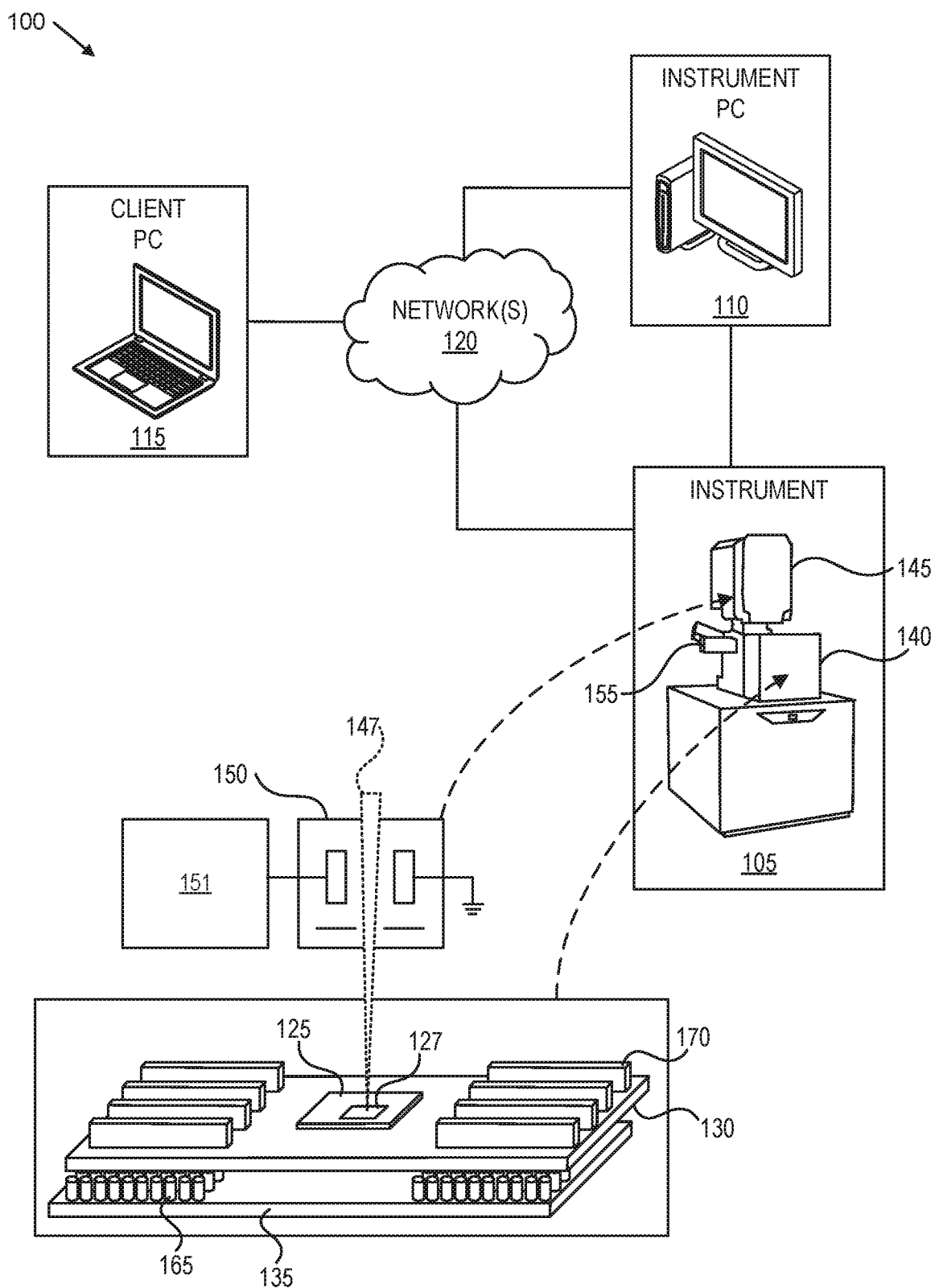
FIG. 1 is a schematic diagram illustrating an example integrated circuit testing system, in accordance with some embodiments of the present disclosure.

In the drawings, like reference numerals refer to like parts throughout the various views unless otherwise specified. Not all instances of an element are necessarily labeled to reduce clutter in the drawings where appropriate. The drawings are not necessarily to scale, emphasis instead being placed upon illustrating the principles being described.

DETAILED DESCRIPTION

While illustrative embodiments have been illustrated and described, it will be appreciated that various changes can be made therein without departing from the spirit and scope of the disclosure. In the forthcoming paragraphs, embodiments of an analytical instrument system, components, and methods to generate difference data are described. Embodiments of the present disclosure focus on integrated circuit characterization and failure analysis in the interest of simplicity of description. Embodiments are not limited to such instruments, but rather are contemplated for analytical instrument systems configured for analysis of microscopic components for which an electrical and/or mechanical activity measurement, which can be measured by techniques including secondary electron detection, can be transformed into the frequency domain. In an illustrative example, MEMs oscillator systems having parts that oscillate at a characteristic frequency of about 100 MHz, or, a period of about 10 ns, for which a surface of the oscillator appears relatively bright in a first conformation and relatively dark in a second conformation, can benefit from the techniques described herein.

Integrated circuit testing involves measurement of individual transistors or groups of transistors of a semiconductor wafer or wafer section (e.g., a diced wafer), termed a "device under test" or DUT. Testing typically includes applying one or more voltage signals to integrated circuit components of the DUT, while measuring a response of the DUT to the signals. Over the course of the test, signals can be varying to simulate off-spec or other challenging conditions, as an approach to stress-testing the DUT, with the goal of eliciting a failure of the DUT while generating measurement data. The measurement data, in turn, can be used to better understand performance characteristics of the DUT, including whether the wafer from which the DUT was taken satisfies one or more quality standards.

A typical IC testing regime includes applying a periodic signal (e.g., a clock signal) to a circuit and monitoring the behavior of the circuit as its operating voltage is varied about a nominal value. That the power consumption of electrical circuity can decrease as the operating voltage decreases, which can be advantageous for low-power applications such as mobile computing, but circuit performance also decreases below a nominal operating voltage. Below a threshold operating voltage, the circuit can cease to operate. An illustrative example is found in the propagation of a clock signal through a circuit. At nominal operating voltage, the circuit can propagate the clock signal through the circuit at a 50% duty cycle, corresponding to a clock signal that is logic high, or "on," 50% of the time. As the operating voltage deviates from a nominal voltage, the duty cycle of the clock signal can also deviate from the target of 50%. Techniques for detecting such periodic clock signals independent of the clock's duty cycle offer the advantage of a redundancy and contactless measurement that have relatively less influence on the measured system than a direct measurement technique (e.g., probe circuits).

Typical approaches to measuring electrical activity on a DUT include directing a beam of electrons at the DUT, measuring signal intensity as a function of time, and using frequency domain information to detect DUT activity at a given clock frequency. Unfortunately, signal-to-noise performance decreases as the duty cycle deviates from a 50% value. Imaging techniques that already suffer from relatively low signal-to-noise detectability for a nominal 50% duty cycle can fail to detect clock signals entirely as the duty cycle trends to 0 or 100% during an IC test. There is a need, therefore, for electron imaging techniques that improve signal-to-noise as duty cycle trends to 0% or 100% during an IC test.

To that end, embodiments of the present disclosure include systems, methods, algorithms, and non-transitory media storing machine-readable instructions for generating difference data describing electrical activity of an integrated circuit component. In an illustrative example, a method can include directing a first pulse of charged particles toward a sample, generating first detector data based at least in part on interactions between the charged particles of the first pulse and the sample, directing a second pulse of charged particles toward the sample, generating second detector data based at least in part on interactions between the charged particles of the second pulse and the sample, and generating difference data using the first detector data and the second detector data, wherein the difference data describe a change between an "on" state of the sample and an "off" state of the sample.

FIG. 1 is a schematic diagram illustrating an example integrated circuit (IC) testing system 100, in accordance with some embodiments of the present disclosure. The example system 100 includes an instrument 105, an instrument computing device (IPC) 110, and a client computing device 115, operably intercoupled via one or more networks 120. The example system 100 is configured to interrogate an IC device, termed a device under test (DUT) 125 using a test assembly 130 electronically coupled with components of the DUT 125 via a controller, also referred to as a test rig 135. Through application of time-varying electronic signals to components of the DUT 125, termed a "test loop," performance characteristics of circuit components of the DUT 125 can be derived as part of quality control and failure analysis techniques for ICs fabricated according to a given IC design.

The instrument 105 includes a test section 140 in which the test assembly 130 is disposed, including the DUT 125 as well as the electronic components to drive the test loop (e.g., the test rig), vacuum components to isolate the DUT 125 from atmosphere, and thermal management systems to remove heat from the DUT 125 during testing. Coupled with the test section 140 is a charged particle column 145. The charged particle column 145 can be an ion beam (e.g., focused ion beam (FIB)) column or an electron beam column (e.g., as part of a scanning electron microscope). In some embodiments, the instrument 105 includes a FIB column and an electron beam column with one of the charged particle sources being coupled with the test section 140 at an angle relative to the charged particle column 145.

The charged particle column 145 can generate a beam of charged particles 147 and can focus the beam of charged particles 147 onto a region 127 of the DUT 125. The interaction of the beam of charged particles 147 with the DUT 125 gives rise to one or more detectable signals, which can be received by one or more detectors 155 operably coupled with the test section 140 and configured to generate detector data based at least in part on measurement of the signal(s). In an illustrative example, the detector(s) 155 can include secondary electron detectors, backscattered electron detectors, photon detectors, imaging sensors (e.g., CCDs) or the like. In contrast to a typical scanning electron microscope (SEM), the test section 140 can omit sample manipulation tools, such as an interlock, sample stage, and the like, at least in part because the DUT 125 can be removably coupled with the test assembly 130, which can be disposed on a stage, a cradle, or other retention assembly that provides electronic and thermal coupling with the test section 140 (e.g., coupled with the test rig 135). The beam of charged particles 147 can be directed toward the DUT 125 using various operational modes, including but not limited to imaging mode, line scan mode, spot mode, and/or pulsed mode.

To that end, the charged particle column 145 can include a beam blanker 150, disposed in the column and configured to apply an electric field and/or a magnetic field across the path of the beam of charged particles 147. For example, control electronics 151, operably coupled with the beam blanker 150, can apply a time-variant voltage to an electrode of the beam blanker 150, such that an electric field can reversibly deflect the beam of charged particles 147 into a beam blocker. The operation of the beam blanker can permit the charged particle column 145 to direct pulses of charged particles toward the DUT 125, as described in more detail in reference to FIGS. 2-5. In some embodiments, a pulse includes as few as 1 charged particle to about 1000 charged particles, including fractions and sub-ranges thereof. For example, a pulse can include 3 charged particles, 5 charged particles, 10 charged particles, 15 charged particles, or the like. In some embodiments, the pulse can extend over multiple cycles of a test signal, such that the techniques of the present disclosure can include sampling from multiple points in a set of detector data corresponding to relatively long period of time, relative to the period of the test signal.

In some embodiments, the test assembly 130 is electronically coupled with components of the test section 140 via couplings 165, by which one or more test cards 170 can be driven. The test cards 170 can encode test loop protocols and can interface with the DUT 125 to input and output signals from the DUT 125 and to relay signals to other constituent elements of example system 100 (e.g., client PC 115 and/or IPC 110).

The computing devices 110 and 115 can be general-purpose machines (e.g., laptops, tablets, smartphones, servers, or the like) that are configured to operate or otherwise interact with the instrument 105. The instrument 105, in turn, can include electronic components that form part of a special-purpose computing device, including control circuitry configured to drive the test loop, operate the test assembly 130, control the electron beam column 145, and operate the vacuum systems and thermal management systems. The IPC 110 can be a machine provided with software configured to interface with the instrument 105 and to permit a user of the instrument 105 to conduct a test of the DUT 125. Similarly, the client pc 115 can be configured to control one or more systems of the instrument 105 (e.g., via the IPC 110 and/or by interfacing with the instrument 105 over the network(s) 120) to conduct a test of the DUT 125.

In some embodiments, the instrument 105, the IPC 110, and/or the client PC 115 are in separate physical locations and are coupled via the network(s) 120 and/or by other means, such as direct connection or by wireless connection (e.g., near-field radio). The network(s) 120 can include public networks (e.g., the internet) and/or private networks (e.g., intranet or local area networks). In some embodiments, the IPC 110 and/or the client PC 115 is/are configured to operate the instrument autonomously (e.g., without human intervention) or semi-autonomously (e.g., with limited human intervention, such as initiating a test, identifying a sample, and/or confirming an automated analytical result). In this way, the example system 100 can be configured to operate with human control and/or autonomously, as part of a scalable IC characterization system for automated testing of ICs.

The example system 100 can include additional and/or alternative components than those illustrated. For example, the instrument 105 can be operably coupled with one or more external components, such as signal generators, data acquisition systems, power supply systems, thermal management, or the like. Such components can be housed in cabinets, for example, that are physically separate from the instrument 105, but can be operably coupled with the charged particle column 145, the test section 140, the detectors 155, etc., by electrical and or fluid-handling connections.

Figure 2:
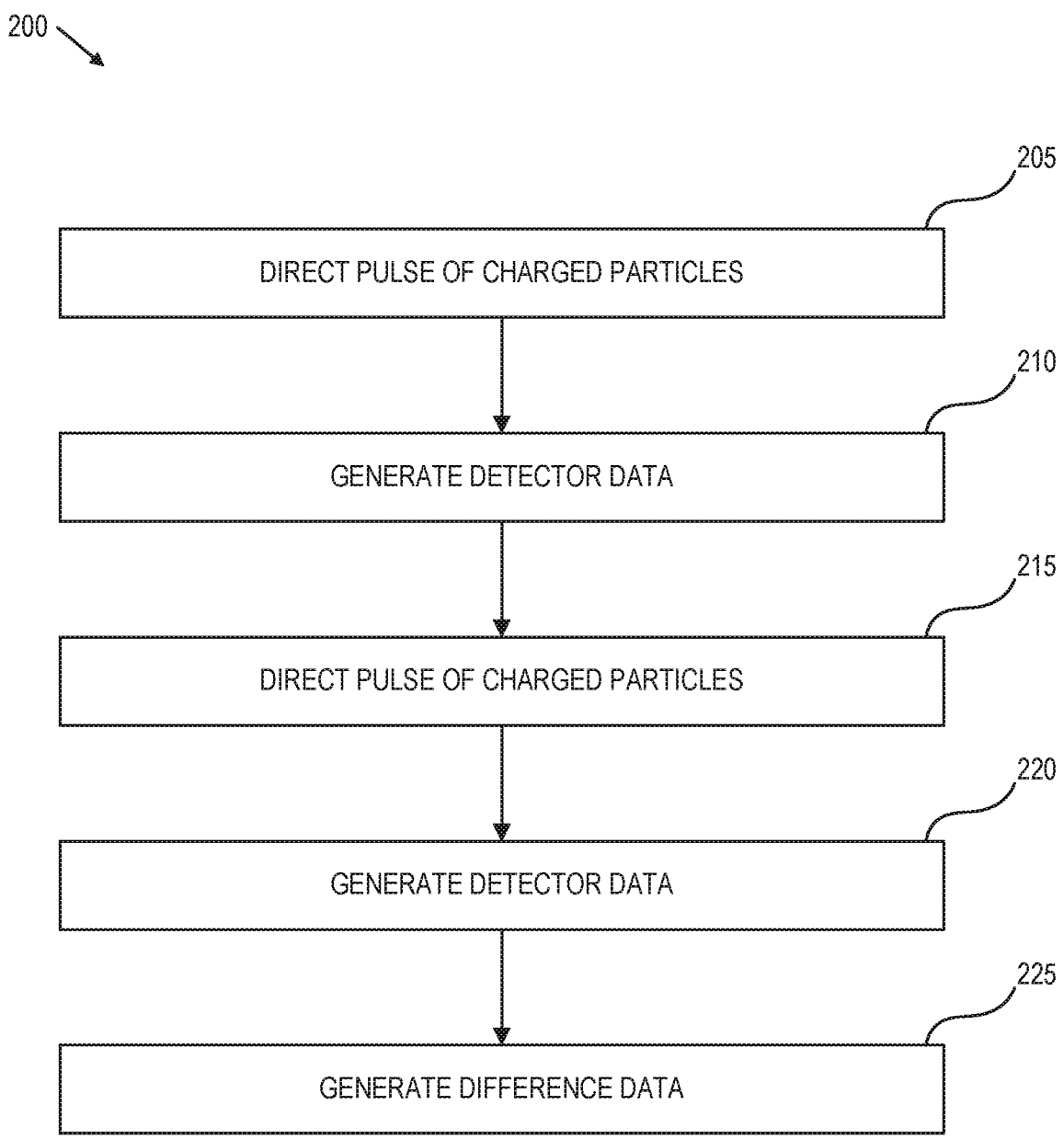
FIG. 2 is a block flow diagram illustrating an example process for generating a difference image of a device under test, in accordance with some embodiments of the present disclosure.

FIG. 2 is a block flow diagram illustrating an example process for generating a difference image of a region of a device under test, in accordance with some embodiments of the present disclosure. One or more operations of the example process 200 can be executed by a computer system in communication with additional systems including, but not limited to, characterization systems, network infrastructure, databases, and user interface devices. In some embodiments, at least a subset of the operations described in reference to FIG. 2 are performed automatically (e.g., without human involvement) or pseudo-automatically (e.g., with human initiation or limited human intervention). In an illustrative example, operations for applying a test signal, directing the pulse(s) of charged particles toward the DUT (e.g., DUT 125 of FIG. 1), and generating detector data can be executed automatically, with the system (e.g., example system 100 of FIG. 1) being configured to generate visualization data showing one or more forms of difference data for interpretation by a human user (example shown in FIGS. 3-5). While example process 200 is described as a sequence of operations, it is understood that at least some of the operations can be omitted, repeated, parallelized, combined, and/or reordered. In some embodiments, additional operations precede and/or follow the operations of example process 200 that are omitted for clarity of explanation, for example, operations for calibration of the electron source, alignment and aberration correction of the beam of electrons, introducing a DUT sample into the vacuum system, calibrating the system, or the like. In another example, a test loop can be initiated by which a test pattern of time-variant voltage signals are applied to integrated circuit components, as part of determining one or more failure modes of the DUT. In reference to example process 200, the operations of the instrument can be coordinated with those of the test assembly (e.g., test assembly 130 of FIG. 1), as part of generating difference data describing electrical activity of IC components of the DUT, from which duty cycle information and other data can be derived.

At operation 205, example process 200 includes directing a pulse of charged particles toward the DUT (e.g., DUT 125 of FIG. 1). The pulse of charged particles can be generated at least in part using a focused beam of charged particles (e.g., ions, electrons) that is intermittently redirected and/or blocked in a beam blanker (e.g., blanker 150 of FIG. 1). Operation 205 can be coordinated with a test signal, as described in more detail in reference to FIGS. 3-4G, such that the pulse of charged particles is incident on a region of the DUT (e.g., the region 127 of FIG. 1) at a time that at least a portion of the DUT is active, also referred to as being in an "on" state.

In this way, one or more detectors (e.g., the detector(s) 155 of FIG. 1) are able to generate detector data based at least in part on interactions between the charged particles of the pulse and the DUT, at operation 210. In some embodiments, detector data includes secondary electron detector data, which can be generated by collecting secondary electrons that are reemitted from the surface of the DUT in response to the pulse of charged particles (e.g., using an Everhart-Thornley, other scintillator detector, or a semiconductor detector). Without being bound to a particular physical mechanism, the secondary electron remission probability can be higher in a region that is electrically active than a region that is electrically inactive, such that detector data describing an active region of the DUT can appear relatively bright in detector data. In the case of an electron image, the relative brightness can appear as a lighter coloration (e.g., a bright or saturated region of the image), while for a spectrum, line scan, or spot signal, the relative brightness can correspond to a higher average signal amplitude (e.g., as a function of time or position).

In some embodiments, operations 205 and/or 210 can include operating the charged particle source in a mode referred to as "CW" or continuous wave, where the beam of charged particles is emitted continuously for a period of time long enough to extend over multiple cycles of the test signal. In CW operation, the detector data can be sampled at high and low points, corresponding to "on" and "off" states, and the difference data generated from the sampled detector data. In such cases, sampling error can occur where the clock signal has a higher frequency than the frequency cutoff of the detector. Where clock signals are typically hundreds of MHz, detector bandwidth can be about 5 MHz for some typical secondary electron detectors. For this reason, a secondary electron detector with a bandwidth on the order of the clock signal or higher can be used to generate difference data directly by sampling the detector data and applying difference operations to the sampled data.

At operation 215, example process 200 includes directing another pulse of charged particles toward the DUT (e.g., DUT 125 of FIG. 1). As described in reference to operation 205, the pulse of charged particles can be generated at least in part using a focused beam of charged particles (e.g., ions, electrons) that is intermittently redirected and/or blocked in a beam blanker (e.g., blanker 150 of FIG. 1). Operation 215 can be coordinated with the test signal, as described in more detail in reference to FIGS. 3-4G, such that the pulse of charged particles is incident on a region of the DUT (e.g., the region 127 of FIG. 1) at a time that at least a portion of the region of the DUT is inactive, also referred to as being in an "off" state. In this way, the one or more detectors are able to generate detector data based at least in part on interactions between the charged particles of the pulse and the DUT, at operation 220. In contrast to operation 210, detector data describing an inactive region of the DUT can appear relatively dark in detector data, relative to the signal generated from an active region of the DUT.

In some embodiments, operations 205 and 210 are repeated in multiple iterations, as part of spatially scanning the beam of charged particles in multiple pulses over at least part of the surface of the DUT. The iterations can be coordinated with multiple instances in which the region of interest of the DUT is electrically active, such that the detector data generated in multiple iterations of operation 210 can be used to generate spatial information about the active region of the DUT. In this way, the "on" state of the region of the DUT can be sampled to produce a "positive" image. Similarly, operations 215 and 220 can be repeated in multiple iterations, as part of spatially scanning the beam of charged particles in multiple pulses over at least the same or similar part of the surface of the DUT. The iterations can be coordinated with multiple instances in which the region of interest of the DUT is electrically inactive, such that the detector data generated in multiple iterations of operation 210 can be used to generate spatial information about the active region of the DUT. In this way, the "off" state of the region of the DUT can be sampled to produce a "negative" image. Line-scan or spot mode data can be used for an analogous purpose, for example, spatially scanning a pulsed beam across a linear region of the DUT and generating one-dimensional detector data showing signal amplitude as a function of beam position. In some embodiments, however, a reference image of the region of the DUT is used, such that operations 215 and 220 are omitted.

The test loop can include drive patterns having frequencies on the order of 1-10 GHz, corresponding to a period on the order of about 1 nsec or less. Physical limitations governing the response time of charged particle microscopy systems can limit the temporal resolution of detector data, such that consecutive iterations of operations 205 and 210 can be separated in time by an offset of about an integer multiple of the period, such that the detector data generated at consecutive iterations of operation 210 are temporally resolved. For example, where the period of the test pattern is about 3 ns, and the temporal resolution of the charged particle system and detectors is about 100 ns, the integer multiple can be 50, which makes the pulse period equal to 50 times the DUT period, or 150 ns. In this way, a first iteration of operations 205 and 210 can be executed at an initial time $t_o$=0, a second at $t_1$=150 ns, a third at t2=300 ns, etc. In this way, each data point is resolved in time and samples a consistent point in the test pattern. Similarly, consecutive iterations of operations 215 and 220 can be separated in time by an offset of about an integer multiple of the period, such that the detector data generated at consecutive iterations of operation 220 are temporally resolved.

In some embodiments, operations 205-220 are parallelized, such that example process 200 includes multiple iterations of operations 205-220 in repetition. In this way, a scan pattern is programmed such that the beam steering circuit holds the focal point of the beam of charged particles at a given location on the surface of the DUT for both operation 205 and operation 215, for which detector data are generated at operation 210 and operation 220, after which the beam is steered to a different location on the surface of the DUT (e.g., by a raster pattern, line-scan, or the like). To accommodate the temporal resolution of the system, successive iterations of operations 205 and 215, and operations 210 and 220, can be offset in time by half-integer multiples of the period of the test pattern. In this context, a half-integer is a number resulting from the division of an odd integer in half. Where a half-integer is represented by a variable "A," the offset can be about A*P, where "P" is the period of the test pattern. As described above, A can have a value such that successive detector data points are temporally resolved, separated in time by about A*P. The value of A can be varied in some cases, for example, as an approach to modulating the sampling rate and reduce total charged particle dose to the surface of the DUT. To that end, A can be defined, such that A is the smallest half-integer for which A*P is longer than a temporal resolution of the system and/or detector used to generate the detector data. In some embodiments, the value of A can be detuned, such that A varies with time and is different (e.g., larger) than the above stated position. Advantageously, however, defining A in the above stated way permits the beam blanker to operate with a consistent pulse frequency and period, rather than a time-variant aperiodic signal, thereby reducing the complexity of coordinating example process 200 with the test loop applied to the DUT.

At operation 225, example process 200 includes generating difference data. As described in more detail in reference to FIGS. 3-4G, the difference data can be generated using the detector data generated at operations 210 and 220 to describe a change between the "on" state of the region of the DUT and an "off" state of the region of the DUT. Operation 225 can include applying one or more transformations to the detector data, such as adding data in a pixel-wise fashion, subtracting data in a pixel-wise fashion, normalization, baseline-offsetting, or the like. In this way, the difference data can reveal individual components and/or groups of components of the DUT that are active at the corresponding point in the test loop.

Figure 3:
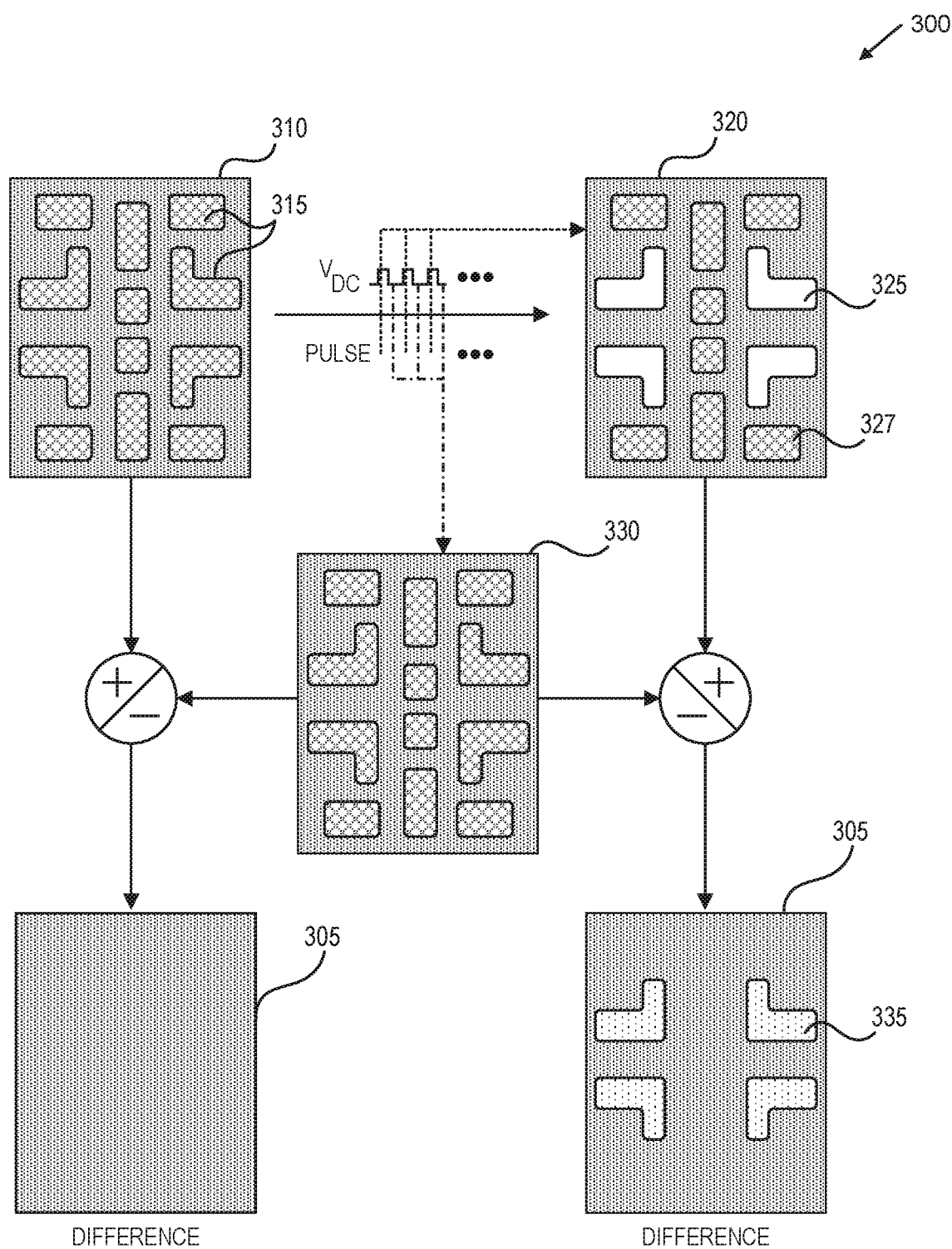
FIG. 3 is a schematic diagram illustrating an example image processing method for generating a difference image, in accordance with some embodiments of the present disclosure.

FIG. 3 is a schematic diagram illustrating an example image processing technique 300 for generating a difference image 305, in accordance with some embodiments of the present disclosure. Generating the difference image 305 includes generating an image of a region 310 of a DUT (e.g., DUT 125 of FIG. 1) in an active state, termed a first image 320, and an image of the region 310 of the DUT in an inactive state, termed a second image 330, as described in reference to FIG. 2, and generating difference data. In the case of image data, the difference data can be the difference image 305. Where detector data include line-scan or point-mode data, difference data can be or include spectrum data. Similarly, image data can be sampled to produce difference spectra showing relative amplitude as a function of position.

The region 310 includes multiple features 315 that can be integrated circuit components, conductive regions of the surface, or other features. In the active "on" portion of the test pattern, one or more of the features 315 can be electrically activated, such that the first image includes one or more relatively bright regions 325, compared to those regions corresponding to inactive features 315 that are relatively dark. In its simplest form, example technique 300 proceeds with the second image 330 being subtracted from the first image 320 to generate the difference image 305. In some cases, however, one or more pre-processing operations can be applied to first image data and/or second image data. For example, first image 320 and second image 330 can be baseline corrected, normalized to a peak intensity value of the first image 320, among other operations that can improve the signal-to-noise ratio of the difference image 305.

To further illustrate the concept of the difference image, a negative case is shown where a reference image of the region 310 is used to generate the difference image 305 using the second image 330, resulting in a blank image. Similarly, portions of the first image 320 that do not include bright regions 325 can produce blank portions of the difference image 305. In contrast relatively bright regions 325 of the first image 320 can reveal active features 335 in the difference image 305.

Advantageously, the example technique 300 is relatively insensitive to the duty cycle of the DUT, at least in part because the first image 320 is generated during the "on" state and the second image 330 is generated during the "off" state. In this way, even in cases where the duty cycle deviates from 50%, active features 335 are revealed in the difference image 305.

FIGS. 4A-4G are schematic diagrams illustrating example integrated circuit testing data, including voltage data and difference images, in accordance with some embodiments of the present disclosure. FIG. 4A, FIG. 4B, FIG. 4D, and FIG. 4F represent voltage signals corresponding to a test pattern using a square wave signal. FIG. 4C, FIG. 4E, and FIG. 4G represent difference images (e.g., difference image 305 of FIG. 3) generated in accordance with the example process 200, as described in more detail in reference to FIGS. 2-3.

FIG. 4A is an example test pattern, using a square wave voltage signal characterized by a period 400. In integrated circuit testing, the period 400 can be on the order of 1-100 nanoseconds, as determined by the IC manufacturer's test protocol. In this way, example process 200 can be coordinated with an arbitrary test pattern. FIG. 4A also illustrates a duty cycle that deviates from 50%. While not to scale, the duty cycle of the example test pattern in FIG. 4A corresponds to a value between 10% and 30%. The techniques of the present disclosure are not limited to this range, however, being relatively insensitive to duty cycle in comparison to conventional techniques. In each of FIG. 4A, FIG. 4B, FIG. 4D, and FIG. 4F, a sampling period 405 is shown across multiple values of the period 400, as indicated by parallel lines intersecting the temporal, horizontal axis.

FIG. 4B illustrates a sampling condition during which a sampling period 405 coincides with two inactive "off" states of the DUT. The resulting difference image, illustrated in FIG. 4C, is a blank image 410. In contrast, FIG. 4D illustrates a sampling condition during which the sampling period 405 coincides with an active "on" state and an inactive "off" state of the DUT. Also shown is a phase offset 415, φ, that can be used to synchronize the sampling period 405 with the active "on" state of the DUT, using the test pattern signal.

In this way, the processes and techniques of the present disclosure (e.g., example process 200 of FIG. 2) can include operations for aligning charged particle pulses and detector data with the active state of the DUT, thereby allowing the system to correct for changes in duty cycle during a test. In some embodiments, the phase offset 415 can be determined by incrementing the phase of the pulse signal by a differential, Δφ, and detector data and/or difference data (e.g., relative to a reference image) can be generated to determine an alignment point. As described in more detail in reference to FIG. 5, the value of the phase offset 415 can be determined based at least in part on an average value of the difference data. This approach can be repeated over the course of a test loop, such that difference data can be generated in a manner that is adaptive to changes in the duty cycle, as illustrated in FIGS. 4F-4G, in which a second phase offset 425 is applied to the sampling period to correct for a decrease in duty cycle.

Figure 5:
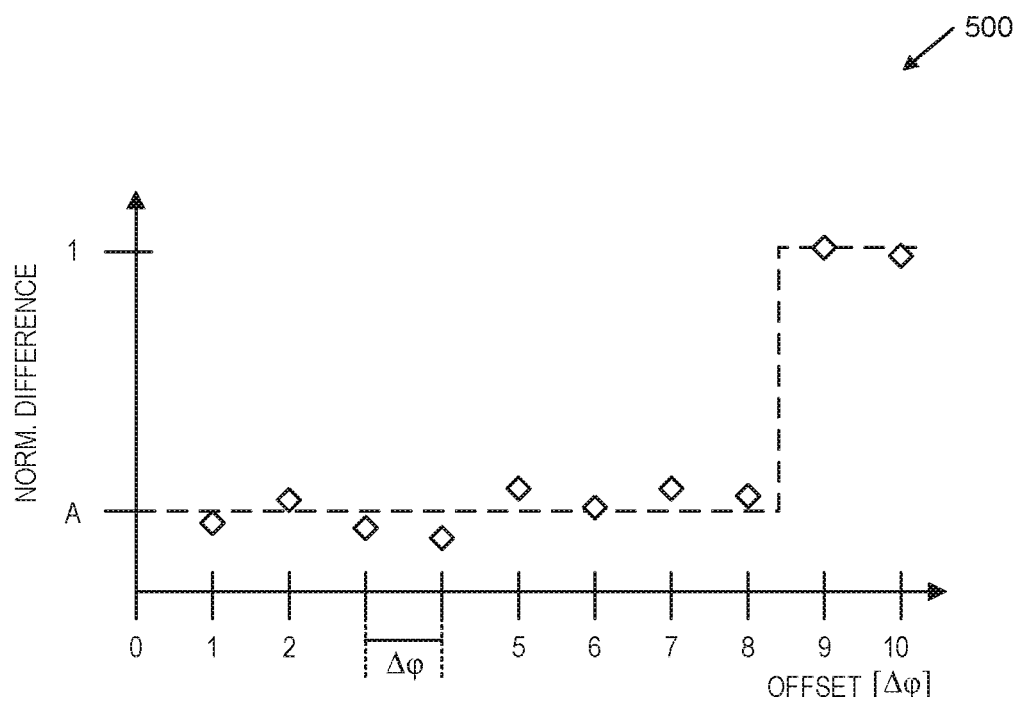
FIG. 5 is a schematic diagram illustrating example average difference data as a function of differential phase difference, in accordance with some embodiments of the present disclosure.

FIG. 5 is a schematic diagram illustrating example average difference data 500 as a function of differential phase difference, in accordance with some embodiments of the present disclosure. As described in more detail in reference to FIG. 4, an asynchrony between the period of the test pattern (e.g., period 400 of FIG. 4) and the sampling period (e.g., sampling period 405 of FIG. 4), resulting in pulses occurring during inactive states of the DUT can cause the systems of the present disclosure (e.g., example system 100 of FIG. 1) to generate blank difference data (e.g., blank image 410 of FIG. 4). To that end, a phase offset (e.g., offset 415 of FIG. 4) can be determined to align the sampling period and the test period. Aligning the two periods can include incrementally increasing the phase offset of the sampling period while generating detector data, and determining an average value of the detector data and/or the difference data. As the phase offset reaches a value where the sampling period aligns with the test period, and where the system samples an active "on" state and an inactive "off" state, the average value of detector data and difference data can increase. The data shown in FIG. 5 are normalized to generalize the description of the techniques of the present disclosure to different test systems. In this way, the techniques described herein can be applied to various periodic systems, for which duty cycle can affect signal-to-noise quality.

In the example data shown in FIG. 5, the phase offset corresponds to about nine increments of the differential phase offset, $\Delta\varphi$. Between the eighth increment and the ninth increment, a discontinuity in the average data is observed, from which the phase offset can be identified. In some embodiments, a relatively smoother transition is observed in difference data, as when the test pattern is a smooth function or a sawtooth function and when the DUT responds in a continuous fashion to smooth voltage input. In such cases, the phase offset, $\varphi$, can be determined based at least in part on an estimate of a stationary point in the data. In some embodiments, the test pattern itself can be reproduced using this technique. For example, by incrementing the phase offset through a full period of the test pattern, average difference data can be used to determine a frequency and/or a shape of the test pattern.

In the preceding description, various embodiments have been described. For purposes of explanation, specific configurations and details have been set forth in order to provide a thorough understanding of the embodiments. However, it will also be apparent to one skilled in the art that the embodiments may be practiced without the specific details. Furthermore, well-known features may have been omitted or simplified in order not to obscure the embodiment being described. While example embodiments described herein center on integrated circuit testing systems, and scanning electron microscope systems in particular, these are meant as non-limiting, illustrative embodiments.

Some embodiments of the present disclosure include a system including one or more data processors and/or logic circuits. In some embodiments, the system includes a non-transitory computer readable storage medium containing instructions which, when executed on the one or more data processors and/or logic circuits, cause the one or more data processors and/or logic circuits to perform part or all of one or more methods and/or part or all of one or more processes and workflows disclosed herein. Some embodiments of the present disclosure include a computer-program product tangibly embodied in non-transitory machine-readable storage media, including instructions configured to cause one or more data processors and/or logic circuits to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the claims. Thus, it should be understood that although the present disclosure includes specific embodiments and optional features, modification and variation of the concepts herein disclosed may be resorted to by those skilled in the art, and that such modifications and variations are considered to be within the scope of the appended claims.

Where terms are used without explicit definition, it is understood that the ordinary meaning of the word is intended, unless a term carries a special and/or specific meaning in the field of charged particle microscopy systems or other relevant fields. The terms "about" or "substantially" are used to indicate a deviation from the stated property within which the deviation has little to no influence of the corresponding function, property, or attribute of the structure being described. In an illustrated example, where a dimensional parameter is described as "substantially equal" to another dimensional parameter, the term "substantially" is intended to reflect that the two parameters being compared can be unequal within a tolerable limit, such as a fabrication tolerance or a confidence interval inherent to the operation of the system. Similarly, where a geometric parameter, such as an alignment or angular orientation, is described as "about" normal, "substantially" normal, or "substantially" parallel, the terms "about" or "substantially" are intended to reflect that the alignment or angular orientation can be different from the exact stated condition (e.g., not exactly normal) within a tolerable limit. For numerical values, such as diameters, lengths, widths, or the like, the term "about" can be understood to describe a deviation from the stated value of up to ±10%. For example, a dimension of "about 10 mm" can describe a dimension from 9 mm to 11 mm, and a time on the order of 1 ns can denote a time from 0.1 ns to 10 ns.

The description provides exemplary embodiments, and is not intended to limit the scope, applicability or configuration of the disclosure. Rather, the ensuing description of the exemplary embodiments will provide those skilled in the art with an enabling description for implementing various embodiments. It is understood that various changes may be made in the function and arrangement of elements without departing from the spirit and scope as set forth in the appended claims. Specific details are given in the description to provide a thorough understanding of the embodiments. However, it will be understood that the embodiments may be practiced without these specific details. For example, specific system components, systems, processes, and other elements of the present disclosure may be shown in schematic diagram form or omitted from illustrations in order not to obscure the embodiments in unnecessary detail. In other instances, well-known circuits, processes, components, structures, and/or techniques may be shown without unnecessary detail.

What is claimed is:

1. A computer-implemented method, comprising:
   directing a first pulse of charged particles toward a sample;

generating first detector data based at least in part on interactions between the charged particles of the first pulse and the sample;
directing a second pulse of charged particles toward the sample;
generating second detector data based at least in part on interactions between the charged particles of the second pulse and the sample; and
generating difference data using the first detector data and the second detector data, wherein the difference data describe a change between an "on" state of the sample and an "off" state of the sample.

2. The computer-implemented method of claim 1, wherein the first pulse and the second pulse are separated in time by a value of about A*P, wherein A is a half-integer, and wherein the value "P" is a period of a periodic electrical signal applied to the sample, measured in units of time.

3. The computer-implemented method of claim 2, wherein a value of A is greater than or about equal to the smallest half-integer for which A*P is longer than a temporal resolution of a system generating the first detector data and the second detector data.

4. The computer-implemented method of claim 1, further comprising:
generating a beam of charged particles using charged particle source;
operating a beam blanker using a periodic pulse signal to pulse the beam of charged particles, the pulse signal having a frequency, "f," and a phase, "φ;" and
modifying the phase of a pulse signal to align an "on" value of the pulse signal in time with an "on" value of an electrical signal applied to the sample.

5. The computer-implemented method of claim 4, wherein modifying the phase of the pulse signal comprises:
incrementing the phase of the pulse signal by a differential "Δφ" over a set of phase values;
generating a set of detector data comprising respective "on" data and respective "off" data for at least a subset of the phase values;
generating a set of difference data using the set of detector data; and
determining a phase offset using the set of difference data, the phase offset corresponding to a discontinuity in an average value of the set of difference data.

6. The computer-implemented method of claim 1, wherein the first pulse of charged particles and the second pulse of charged particles are generated using a scanning electron microscope in imaging mode, and wherein the difference data comprise a difference image of a surface of the sample.

7. The computer-implemented method of claim 1, wherein the first pulse of charged particles and the second pulse of charged particles are generated using a scanning electron microscope in spot mode, and wherein the difference data comprise a difference signal of amplitude against time.

8. The computer-implemented method of claim 1, wherein the first detector data correspond to the "on" state of the sample, wherein the second detector data correspond to the "off" state of the sample, and wherein generating the difference data comprises:
generating a first set of detector data for the "on" state of the sample, including the first detector data;
generating a second set of detector data for the "off" state of the sample, including the second detector data; and
defining the difference data as a difference of the first set of detector data and the second set of detector data.

9. The computer-implemented method of claim 1, wherein the sample comprises an integrated circuit, and wherein the charged particles are directed at a region of the integrated circuit including a conductive feature.

10. The computer-implemented method of claim 1, wherein the difference data comprise secondary electron image data.

11. A system, comprising:
a charged particle source, configured to generate pulses of charged particles;
control circuitry, operably coupled with the charged particle source; and
one or more non-transitory machine-readable storage media, operably coupled with the control circuitry and storing instructions that, when executed, cause the system to perform operations comprising:
directing a first pulse of charged particles toward a sample;
generating first detector data based at least in part on interactions between the charged particles of the first pulse and the sample;
directing a second pulse of charged particles toward the sample;
generating second detector data based at least in part on interactions between the charged particles of the second pulse and the sample; and
generating difference data using the first detector data and the second detector data, wherein the difference data describe a change between an "on" state of the sample and an "off" state of the sample.

12. The system of claim 11, wherein the first pulse and the second pulse are separated in time by a value of about A*P, wherein A is a half-integer, and wherein the value "P" is a period of a periodic electrical signal applied to the sample, measured in units of time.

13. The system of claim 12, wherein a value of A is greater than or about equal to the smallest half-integer for which A*P is longer than a temporal resolution of a system generating the first detector data and the second detector data.

14. The system of claim 11, wherein the operations further comprise:
generating a beam of charged particles using the charged particle source;
operating a beam blanker using a periodic pulse signal to pulse the beam of charged particles, the pulse signal having a frequency, "f," and a phase, "φ;" and
modifying the phase of a pulse signal to align an "on" value of the pulse signal in time with an "on" value of an electrical signal applied to the sample.

15. The system of claim 14, wherein modifying the phase of the pulse signal comprises:
incrementing the phase of the pulse signal by a differential "Δφ" over a set of phase values;
generating a set of detector data comprising respective "on" data and respective "off" data for at least a subset of the phase values;
generating a set of difference data using the set of detector data; and
determining a phase offset using the set of difference data, the phase offset corresponding to a discontinuity in an average value of the set of difference data.

16. The system of claim 11, wherein the first pulse of charged particles and the second pulse of charged particles are generated using a scanning electron microscope in imaging mode, and wherein the difference data comprise a difference image of a surface of the sample.

17. The system of claim 11, wherein the first pulse of charged particles and the second pulse of charged particles are generated using a scanning electron microscope in spot mode, and wherein the difference data comprise a difference signal of amplitude against time.

18. The system of claim 11, wherein the first detector data correspond to the "on" state of the sample, wherein the second detector data correspond to the "off" state of the sample, and wherein generating the difference data comprises:
   generating a first set of detector data for the "on" state of the sample, including the first detector data;
   generating a second set of detector data for the "off" state of the sample, including the second detector data; and
   defining the difference data as a difference of the first set of detector data and the second set of detector data.

19. The system of claim 11, wherein the sample comprises an integrated circuit, and wherein the charged particles are directed at a region of the integrated circuit including a conductive feature.

20. The system of claim 11, wherein the difference data comprise secondary electron image data.

* * * * *